Patented July 25, 1950

2,516,240

UNITED STATES PATENT OFFICE 2,516,240

PREPARATION OF PENICILLAMINE

Ralph Mozingo, Elizabeth, James F. McPherson, Rahway, and Karl Folkers, Plainfield, N. J., assignors to Merck & Co., Inc., Rahway, N. J., a corporation of New Jersey No Drawing. Application March 22, 1946, Serial No. 656,514

1 Claim. (Cl. 260—534)

This invention is concerned generally with novel chemical compounds and processes for preparing the same; more particularly it is concerned with penicillamine, a primary intermediate in the synthesis of penicillin and to processes for preparing the same.

Penicillamine has been prepared from penicillin by hydrolyzing a salt of penicillin with hot dilute mineral acid (Nature 151, 107 (1943)). It has been determined that the product thus obtained is an $\alpha$-amino acid of the d- or "unnatural" series, having a structure fully defined by the chemical name, d-$\alpha$-amino-$\beta$-mercapto-isovaleric acid.

It is now discovered in accordance with the present invention, that an $\alpha$-acylamido-$\beta,\beta$-dimethyl-acrylic acid can be reacted with an alkane thiolic acid to form an $\alpha$-acylamido-$\beta$-acyl-thioisovaleric acid, which, upon hydrolysis, produces racemic $\alpha$-amino-$\beta$-mercapto-isovaleric acid, i. e., dl-penicillamine.

The above reactions can be indicated generally as follows:

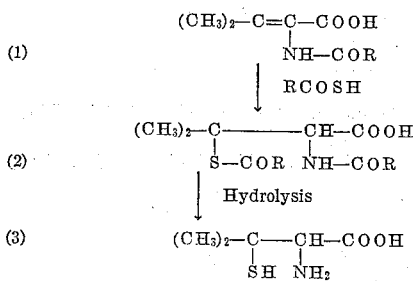

The reaction between $\alpha$-acylamido-$\beta,\beta$-dimethyl-acrylic acid and alkane thiolic acid is conveniently carried out by heating the reactants together, either alone or in the presence of a mutual solvent or inert diluent; it is presently preferred to use an excess of alkane thiolic acid, for example, about 5 or 10 moles per mole of acrylic acid derivative. The reaction is conducted at a temperature of about 85° C. or above, although lower temperatures can be employed if desired. When the temperature is maintained at about 90° C., the time for a substantially complete reaction is approximately sixteen hours. The reaction mixture thus obtained comprises a solution of the reaction product, $\alpha$-acylamido-$\beta$-acyl-thioisovaleric acid, dissolved in excess alkane thiolic acid, from which the reaction product is recovered by evaporation to dryness.

The solution can be hydrolyzed directly by means of aqueous acid or alkaline solution, such as dilute aqueous sulfuric acid, dilute aqueous hydrobromic acid, dilute aqueous sodium hydroxide solution and the like. Best results are obtained by heating the dry product with a mixture containing acetic acid and dilute aqueous hydrochloric acid and then evaporating the hydrolysis mixture to dryness under reduced pressure, to produce crude dl-penicillamine hydrochloride. This material can be purified by conversion to the mercuric chloride addition product, followed by reconversion to penicillamine hydrochloride. This can be accomplished as follows: The crude dl-penicillamine hydrochloride is extracted with water, neutralized to a pH of approximately 6, and the solution filtered to remove precipitated sulfur. The clear filtrate is added directly to a warm aqueous solution containing approximately 5–10% of mercuric chloride, whereupon the yellowish mercuric chloride addition compound of dl-penicillamine precipitates and is recovered by filtration or centrifugation. It is reconverted to penicillamine hydrochloride by suspending in water and treating with hydrogen sulfide. The mercuric sulfide is filtered and the colorless filtrate evaporated to dryness under reduced pressure to produce substantially pure dl-penicillamine hydrochloride. If desired, addition products of other mercuric salts such as mercuric acetate, mercuric bromide and the like can be utilized for this purification in place of mercuric chloride; upon treating such addition products with hydrogen sulfide, the corresponding salt of penicillamine is obtained. The above mineral acid salts of penicillamine can be neutralized by treatment with alkaline material, as for example, pyridine, piperidine, quinoline and the like and the resulting product crystallized from a lower aliphatic alcohol such as ethyl alcohol, to produce penicillamine.

The dl-penicillamine, thus prepared, can be converted directly to penicillin G by reaction with 2-benzyl-4-alkoxy-methylene-5(4)-oxazolones, as described in detail in a co-pending application of one of the present applicants, Serial No. 656,772, filed March 23, 1946 which issued as Patent No. 2,480,466 on August 20, 1949.

The following example illustrates a method of carrying out the presently invented process, but it is to be understood that this example is given by way of illustration and not of limitation.

Example

About 2.0 g. of $\alpha$-acetamido-$\beta,\beta$-dimethyl-acrylic acid (M. P. 200–201° C. dec.) and about 7.0 cc. of thioacetic acid (B. P. 88–89° C.) are heated under reflux for aproximately 16 hours. A clear orange-yellow solution results and can be evaporated to dryness to produce substantially pure α-acetamido-β-acet-thio-isovaleric acid. It can be hydrolyzed by heating for approximately 2 hours at about 90° C. with about 31 cc. of glacial acetic acid, about 5 cc. of concentrated hydrochloric acid and about 19 cc. of water. The hydrolyzed solution is evaporated to dryness under reduced pressure to produce dl-penicillamine hydrochloride. This material is dissolved in approximately 10 cc. of water, and sufficient sodium hydroxide solution (30%) is added to bring the pH to approximately 6. The substantially neutral solution is then filtered and the filtrate added to a warm solution containing about 3.5 g. of mercuric chloride dissolved in about 50 cc. of water. The yellowish mercuric chloride addition compound of dl-penicillamine precipitates and the resulting slurry is allowed to stand for approximately 16 hours to complete the crystallization of the addition compound. This compound is separated by filtration or centrifugation, and the product washed and then suspended in a small amount of water and the slurry treated with hydrogen sulfide gas. The resulting mercuric sulfide is removed by filtration and the colorless filtrate is evaporated to dryness under reduced pressure to produce approximately 260 mgm. of substantially pure dl-penicillamine hydrochloride; M. P. 145–148° C. This salt is treated with pyridine and the product crystallized from ethyl alcohol to produce substantially pure dl-penicillamine; M. P. 201–202° C. Other α-acylamido-β,β-dimethyl acrylic acids can be employed in place of the α-acetamido-β,β-dimethyl acrylic acid used in the example, as for example, α-propionamido-β,β-dimethyl-acrylic acid, α-benzamido-β,β-dimethyl acrylic acid, α-butyramido-β,β-dimethyl acrylic acid, α-phenacetamido-β,β-dimethyl acrylic acid and the like and said acrylic acid derivative can be reacted with any alkane thiolic acid, as for example, thioacetic acid, propane thiolic acid, butane thiolic acid and the like to produce the corresponding α-acylamido-β-acyl-thio-isovaleric acid. This compound is then hydrolyzed and the hydrolysis product treated as described above to produce substantially pure dl-penicillamine.

Modifications may be made in carrying out the present invention without departing from the spirit and scope thereof, and the invention is to be limited only by the appended claim.

We claim:
The process which comprises heating α-acetamido-β,β-dimethyl-acrylic acid with thioacetic acid, said heating operation being carried out under reflux for a period of approximately 16 hours to produce N:S-diacetyl-dl-penicillamine; heating this product with a mixture containing acetic acid and dilute aqueous hydrochloric acid to produce dl-penicillamine hydrochloride; and reacting said dl-penicillamine hydrochloride with pyridine to form dl-penicillamine.

RALPH MOZINGO.
JAMES F. McPHERSON.
KARL FOLKERS.

REFERENCES CITED

The following references are of record in the file of this patent:

UNITED STATES PATENTS

| Number | Name | Date |
|---|---|---|
| 2,071,327 | Bley | Feb. 23, 1937 |
| 2,406,362 | Farlow | Aug. 27, 1946 |

FOREIGN PATENTS

| Number | Country | Date |
|---|---|---|
| 521,944 | Great Britain | June 5, 1940 |

OTHER REFERENCES

Neuberger: "Biochem. J.," vol. 32 (1938) pp. 1455 and 1452.

Karrer: "Organic Chemistry" (1938), Elsevier, New York, pp. 88, 90 and 91.

Abstract of "Arkiv. Kemi. Mineral. Geol.," 14A No. 7–22 pp. (1940).

Carter et al.: "J. Biol. Chem.," vol. 139 (1941), pp. 247–254.

Holmberg et al.: "Chemical Abstracts," vol. 35 (1941), p. 2113.

Merck Report CMR–M–Ia, November 1943, pp. 2–5.

Abraham et al.: "Nature," vol. 151 (1943), p. 107.

Science, vol. 102, Dec. 21, 1945, 627 to 629.

Cornell Report CMR–D–27, March 1, 1945, pp. 1, 2, 3, 6 and 9.

Cornell Report CMR–D–37, Dec. 1, 1945, pp. 1, 4 and 21.

Du Vigneaud et al.: "Science," vol. 104, Nov. 1946, pp. 433 and 450.

Science, vol. 105, June 27, 1947, pp. 653, 654, 658 and 659.